(No Model.)
H. T. KING.
MANURE DRILL.
No. 281,191. Patented July 10, 1883.
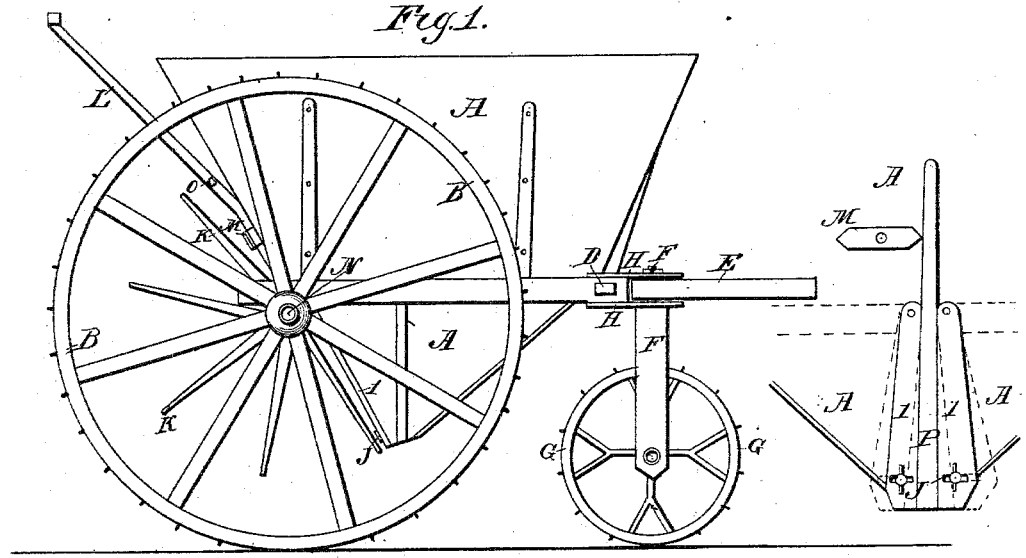
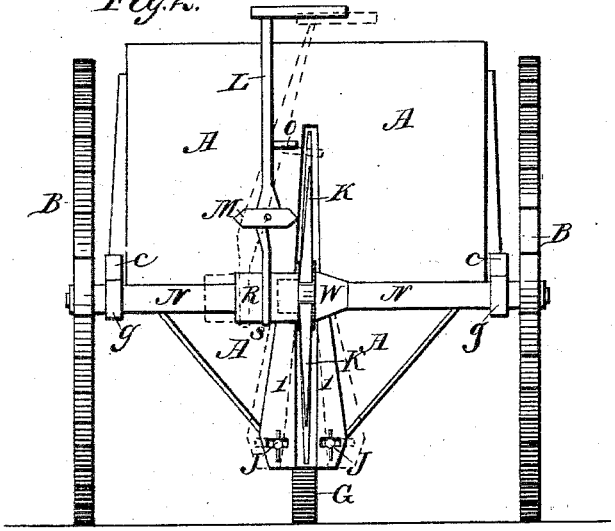
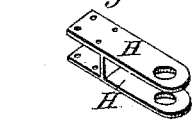
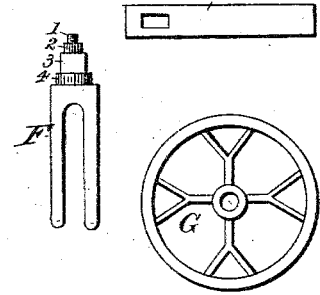
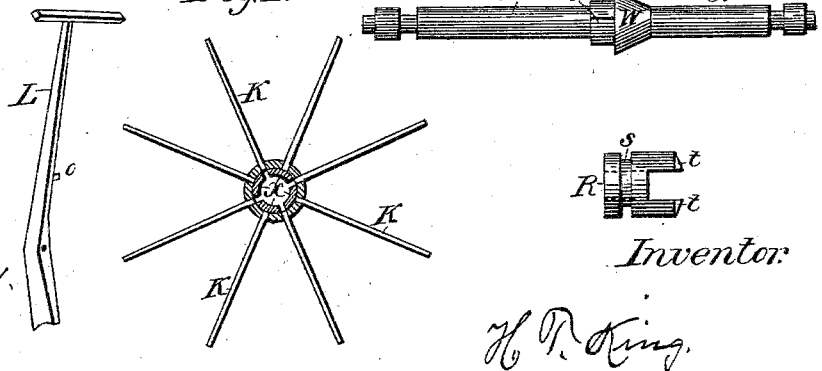
Witnesses.
Inventor:
H. T. King.

UNITED STATES PATENT OFFICE.

HENRY T. KING, OF FALKLAND, NORTH CAROLINA.

MANURE-DRILL.

SPECIFICATION forming part of Letters Patent No. 281,191, dated July 10, 1883.

Application filed August 21, 1882. (No model.)

*To all whom it may concern:*

Be it known that I, HENRY THOMAS KING, a citizen of the United States, residing at Falkland, in the county of Pitt and State of North Carolina, have invented a new and useful Manure-Drill, (which I do not believe ever to have been patented in this country or any other,) of which the following is a specification.

My invention relates to manure-drills in which a hub provided with rods, forming a rimless wheel, revolves through a hopper, and a trundle-wheel and beam in front act as a guide; and the objects of my invention are to regulate the drilling of manure; to afford proper facilities for guiding the rimless wheel, making it revolve with the axle or holding it stationary; and to provide for guiding it without manual labor. I attain these objects by the mechanism illustrated in the accompanying drawings, in which—

Figure 1 is a side view of the entire machine, and also a back view of hopper. Fig. 2 is a back view of the entire machine. Fig. 3 represents the trundle-wheel, standard, beam, and piece by which they are attached to the drill. Fig. 4 is a representation of handle-rod, rimless wheel, cylindrical slide, and the axle.

The side railings, C C, the end railing, D, and the side standards form the frame-work of the body of the machine. The end railing, D, fits mortises in the side railings, C C. To the rear ends of the railings C C are secured the boxes *g g*, working on the axle N N. The wheels B B are fastened on the axle N N, so that when the wheels B B turn the axle N N turns with them. The rimless wheel K K works on the enlarged part *u* of the axle N N, which part *u* has two grooves, V, one on each side, and a shoulder, W. The wheel K K has four grooves, X, on the inside of its hub. In the grooves V and X of the axle and wheel work the ends *t t* of the cylindrical slide R. The handle-rod L, working on the pivot M, is furnished with a rod or stud, O, and works in the groove S of the slide R. To the left of the part *u* of the axle N N works the slide R. The shoulder W holds the wheel K K in position on the right. The slides 1 1 are fastened at the top on a pivot and at the bottom by the screws and nuts J J. The trundle-wheel G works in the opening of the standard F F. Where the standard F F passes through the slabs H H, which are fastened to the end beam, D, of the frame, it is round; but where it passes through the beam E it is square and fits a square mortise in the beam. The beam E is the part by which the machine is to be drawn, the motive power being a horse or some other animal. The end of the standard F F above the slabs H H is furnished with a nut. By pulling the outer end of the beam E around, it also turns the wheel G, making it always face the same direction as the beam E. Pulling the beam E forward draws the entire machine, and turning the wheels B B with everything in position, as shown in Fig. 2, carries the rods of the wheel K K in and out of the hopper A A though the opening P. By pushing the handle-rod L to the right, it throws the ends *t t* of the slide R out of the grooves V and X of the axle N and wheel K K, and also throws the rod O between one of the rods of the wheel K K and the hopper A A, leaving the wheels B B and the axle N N free to revolve, while the wheel K K is held stationary. By pushing the handle-rod L back to position, it throws the ends *t t* of the slide R against the wheel K K, and one-quarter or less of a revolution of the axle N N throws them in position shown in Fig. 2. By the proper manipulation of the nuts and screws J J in the slots of the slides 1 1, the latter can be adjusted right and left to any position. The rods of the wheel K K are not made with the hub, but have one end with threads, by which they are screwed into the hub.

What I claim as my invention, and desire to secure by Letters Patent, is—

The combination of a cylindrical slide, R, arranged on the axle N N, with the ends *t t*, working in the grooves V and X of the axle N N and wheel K K, and governed by the handle-rod L, working in the groove S of the slide R and carrying the rod O, as heretofore described.

HENRY THOMAS KING.

Witnesses:
JAMES ASHLEY COBB,
JNO. H. SMITH.